Sept. 15, 1964     K. S. LAURIE     3,148,410
METHOD AND APPARATUS FOR STRETCHING FILM
Filed Dec. 6, 1962     3 Sheets-Sheet 2
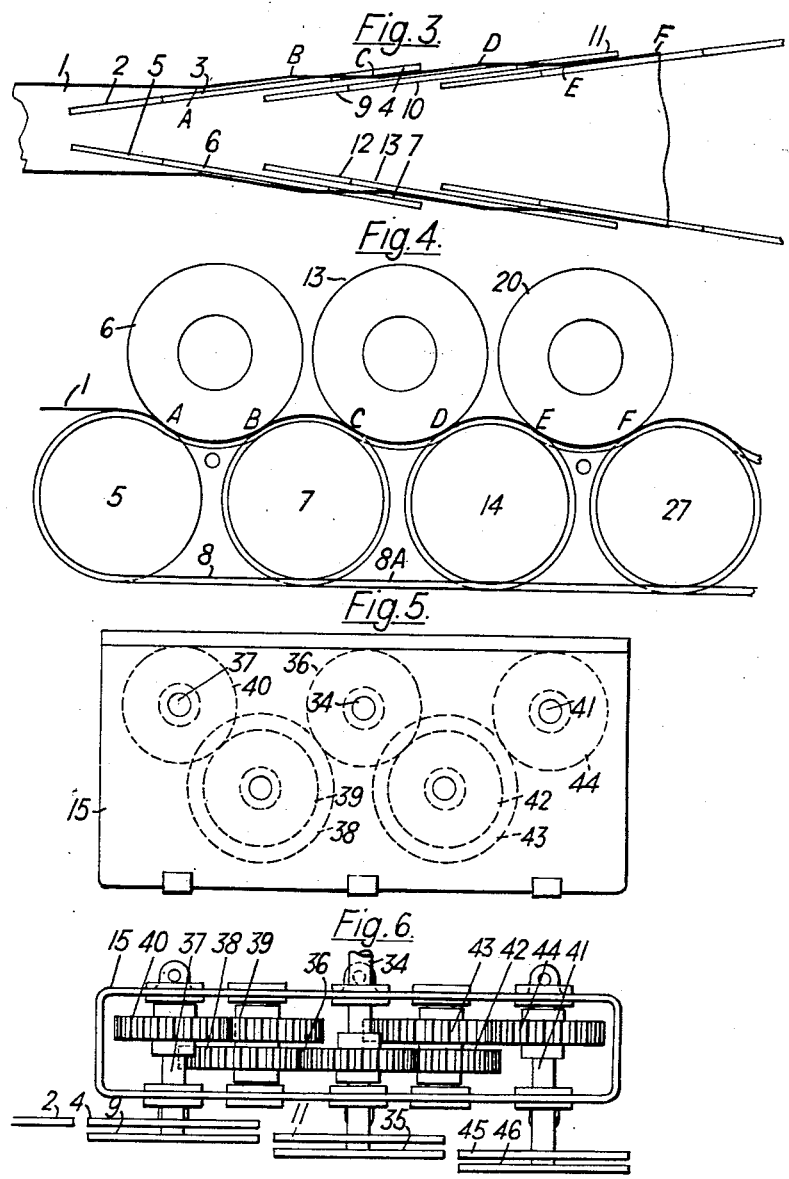
Inventor:
KENNETH S. LAURIE
By Howson & Howson
Attorneys Sept. 15, 1964  K. S. LAURIE  3,148,410
METHOD AND APPARATUS FOR STRETCHING FILM
Filed Dec. 6, 1962  3 Sheets-Sheet 3

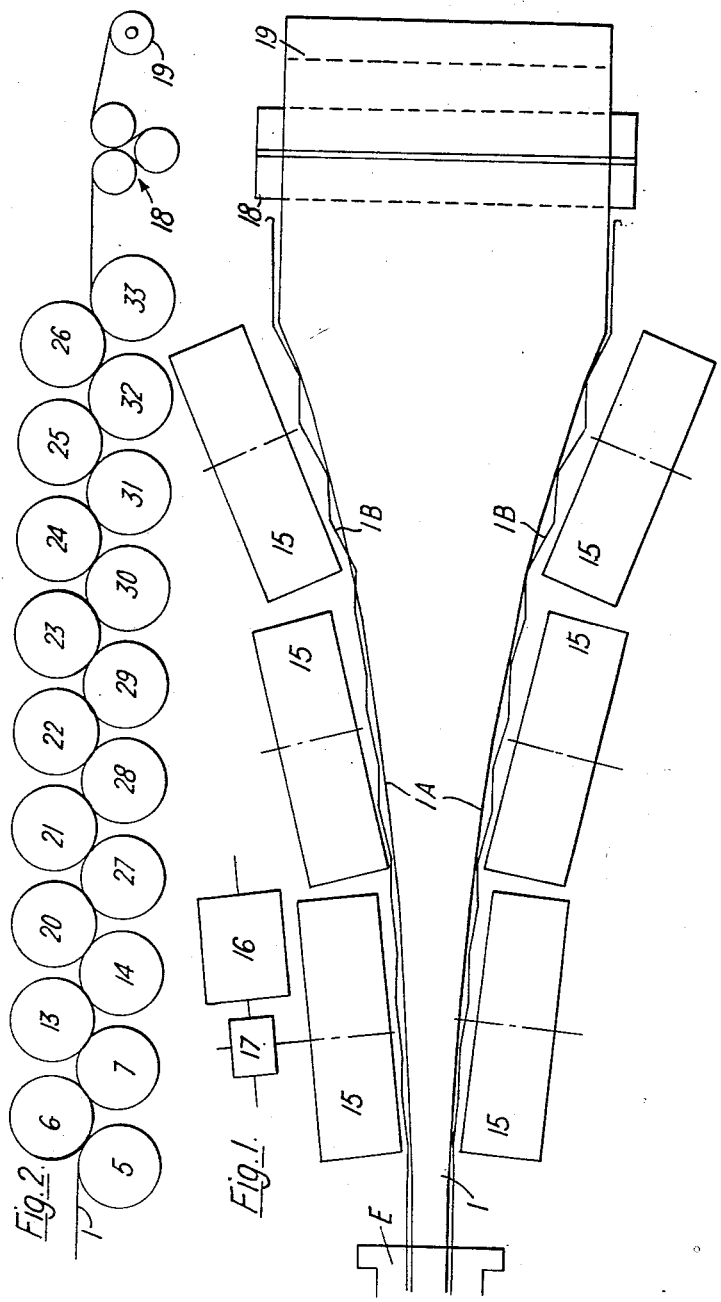

Inventor:
KENNETH S. LAURIE
By Howson & Howson
Attorneys 3,148,410
METHOD AND APPARATUS FOR
STRETCHING FILM
Kenneth Somerville Laurie, Glasgow, Scotland, assignor to John Dalglish & Sons, Limited, Glasgow, Scotland, a British company
Filed Dec. 6, 1962, Ser. No. 242,759
14 Claims. (Cl. 18—1)

This invention relates to apparatus for stretching film.

Films of synthetic resinous material, for example, polythene and polypropylene, are believed to acquire their best mechanical properties when stretched in both directions. The stretch ratio may with benefit be as much as 9:1 in each direction, resulting in an increase in surface area of 81:1. Alternate width and length stretching in stages has been proposed, but experiments have shown that the film, after a partial stretch in one direction, is very weak in the other direction and may split when stretch is applied in the last mentioned direction.

An object of the present invention is to provide apparatus for stretching film longitudinally and laterally substantially simultaneously.

According to the present invention we provide apparatus for stretching film comprising a pair of interspaced opposed drawing devices adapted to act on opposite edge portions of the film fed thereto in a stretchable and taut state so as to stretch the film longitudinally, said devices being mutually angled divergently in the direction of travel of the film so that the film is stretched laterally substantially simultaneously with the longitudinal stretching.

The amount of stretch may be increased by feeding the film to successive pairs of said drawing devices in which the interspacing between the successive opposed pairs and their drawing speeds progressively increases.

An embodiment of the invention will now be described, by way of example, with reference to the accompanying diagrammatic drawings, in which:

FIG. 1 is a plan view of apparatus according to the invention,

FIG. 2 is a side view corresponding to FIG. 1,

FIG. 3 is a fragmentary detail plan view corresponding to FIG. 1 to a larger scale, FIG. 4 is a side view corresponding to FIG. 3, FIG. 5 is a side view of a gearbox for the apparatus, FIG. 6 is a plan view corresponding to FIG. 5 with the top of the gearbox removed.

Figure 7:
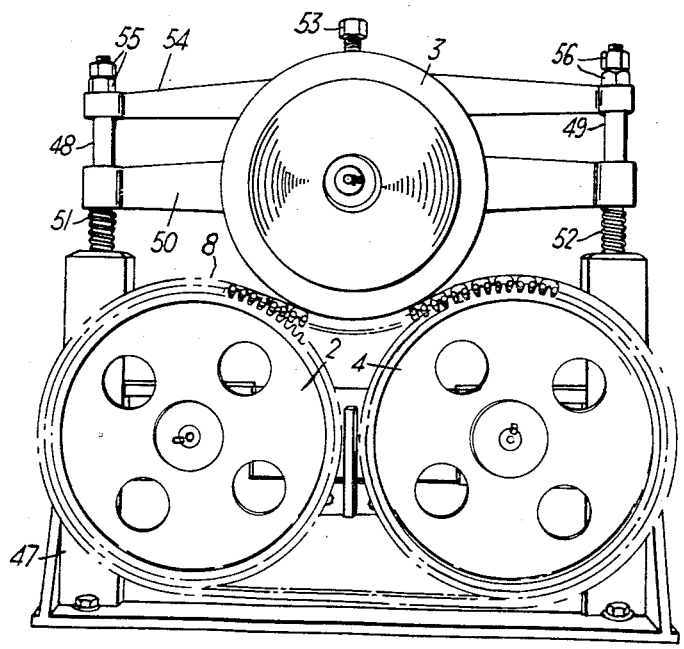
FIG. 7 is a front view of a mounting for one set of wheels.

Referring to the accompanying drawings, a film 1 nominally 5" wide and 0.081" thick is extruded from an extruder E, FIG. 1, of known type, and comes from the extruder slot preferably with a holding bead on each edge. The film 1 is then stretched in 9 stages, each stage increasing both the length and the width of the film in the ratio of about 1.28:1 over the dimensions of the previous stage. Each stage, therefore, besides widening the film 28% also runs 28% faster than the previous stage. When the film has passed through the 9th stage, its width is about 46 to 47 inches, slightly over the 9:1 ratio, and similarly the speed of running has increased over 9 times.

The first drawing stage, see FIGS. 3 and 4, consists of two interspaced and opposed sets of three wheels 2, 3, 4 and 5, 6, 7 one set being located at each edge of the film 1. In each of said sets, two wheels 2, 4 and 5, 7 lie below the film and are connected by a chain 8, and the single upper wheels 3, 6 are pressed down on top of the chain 8 between the two lower wheels. The film 1 is gripped between the upper wheels 3, 6 and the chain 8 on the lower wheels. As shown in FIG. 3, the wheels 2, 3, 4 and 5, 6, 7 diverge outwardly, in the direction of travel of the film, thus giving simultaneously a sidewise stretch to the film.

In the second stage, in each set, the first wheels 9, 12 of the lower wheels 9, 11 and 12, 14 are on the same shaft as the last wheels 4, 7 of the lower wheels in the first stage, and the first wheels 9, 12 run idle on their shaft, being driven at second stage speed by their chains 8A. The top wheels 3, 6 and 10, 13 in said stages bear with positive pressure on the two lower wheels 4, 7 and 11, 14 only, but are sufficiently close to the first wheels 2, 5 and 9, 12 and to the connecting chain 8A, to engage the film 1. Thus, the film is drawn widthwise during the contact length of the stage (about 7") and at the same time is drawn lengthwise by the positive grip on the wheels 4, 7 and 11, 14.

Theoretically, the film edges should follow a curved path as indicated in FIG. 1 by the line 1A. In practice, a near enough approximation is obtained by dividing the nine stages into three straight lengths, as indicated by the line 1B in FIG. 1, opposed wheels in successive stages being spaced further apart progressively.

Three gearboxes 15 are provided at each side, and each gearbox carries three overlapping stages and contains simple driving gear to give the lengthwise draw to each stage. All six gearboxes 15 may be identical, with the drive to each pair different in ratio. Each gearbox 15 may take about 1 H.P., and the torque is greatest and the speed least on the first pair. Each gearbox is driven by a 1 H.P. Selsyn motor 16 and worm reduction gear 17, a master Selsyn motor, not shown, being connected to a final drive to draw rolls 18 and coiling gear 19.

Each gearbox 15, with its Selsyn motor 16 and reduction gear 17 may be mounted on a sub-rail with provision for varying width of film.

The temperature for drawing may be approximately 120° C. to 140° C. and be obtained by steam heat. It is desirable to keep all the mechanical parts outside the actual heat, and hot air may be applied to the film by a simple parallel flow system of low velocity applied above and below the film by ducts which fit inside the drawing wheels. Return air trunking may be separate and may incorporate fans and heaters. Infra-red or other heating means may alternatively be used.

Referring now to FIG. 2, suitable speeds for the top wheels 6, 13 and 20 to 26 and the corresponding wheels at the other side are respectively in revolutions per minute 12.8, 16.4, 21, 26.8, 34.4, 44.6, 57.2, 73.2 and 93.6, and the speeds of the film 1 at the nips between these wheels and the chains on the wheels 7, 14 and 27 to 33 are respectively in feet per minute 40.3, 51.6, 66, 81, 108, 140, 180, 230 and 294. The widths of the films 1 at the nine successive stages is as follow 7.9, 10, 12, 15.9, 19.8, 23.8, 32.0, 40.2 and 48.3 inches. The film may be trimmed before passing to the draw rolls 18.

Referring now to FIGS. 3 and 4, the widthwise stretch is effected over the lengths between the points AB, C, D, EF and so on, and lengthwise stretch is effected between the points CB, BD, DF and so on.

A gearbox 15 will now be described with reference to FIGS. 5 and 6. The gearbox 15 is driven by a main shaft 34 from the reduction gear 17 and the shaft 34 has the wheel 11 of the second set fixed thereto and a wheel 35 of the third set idling thereon. The shaft 34 also carries a gear wheel 36 which drives a shaft 37 through reduction gears 38, 39, 40, and drives a shaft 41 through step-up gears 42, 43, 44. The shaft 37 has the wheel 4 of the first set fixed thereto and carries the wheel 9 of the second set idling thereon, and the shaft 41 has a wheel 45 of the third set fixed thereto and a wheel 46 of the fourth set idling thereon. Gear wheels 36, 39, 40, 42 and 44 each have 32 teeth, and gear wheels 38 and 43 each have 41 teeth. Thus, the shafts 37, 34 and 41 are driven successively faster. The worm reduction gear 17 for the first gearbox 15 has a ratio of 61:1, and the ratios of the second and third gearboxes are respectively 30:1 and 14:1.

A mounting for the set of wheels 2, 3, 4 is shown in FIG. 7 and consists of a frame 47 carrying the wheels 2 and 4 and posts 48, 49 on which a cross bar 50 is slidably adjustable vertically and carries the wheel 3. The bar 50 rests on compression springs 51, 52 and is height adjustable by a screw-threaded rod 53 captive at its lower end in the bar 50 and passing through a tapped hole in a cross bar 54 resting on shoulders on the posts 48, 49 and held by nuts 55, 56. Adjustment of the wheel 3 enables the wheel 3 to be raised for insertion of the film between same and the chain 8 and to be lowered to provide the required loading to effect gripping of the film.

The chains and chain wheels in each set of wheels may be replaced by pulley wheels and rubber belts, and the upper wheel in each set may be rubber faced and be separately driven through gearing.

I claim:

1. Apparatus for stretching film comprising at least one pair of interspaced opposed drawing devices adapted to act on opposite edge portions of the film fed thereto in a stretchable and taut state so as to stretch the film longitudinally, each said drawing device comprising first and second lower wheels, an endless drive means extending around said first and second lower wheels, and an upper wheel pressing downwards on the drive means so as to form a nip for the film edge portions, said drawing devices being mutually angled divergently in the direction of travel of the film so that the film is stretched laterally substantially simultaneously with the longitudinal stretching.

2. Apparatus for stretching film comprising at least one pair of interspaced opposed drawing devices adapted to act on opposite edge portions of the film fed thereto in a stretchable and taut state so as to stretch the film longitudinally, each said drawing device comprising first and second lower wheels, an endless drive means extending around said first and second lower wheels, and an upper wheel pressing downwards on the drive means so as to form a nip for the film edge portions, said drawing devices being mutually angled divergently in the direction of travel of the film so that the film is stretched laterally substantially simultaneously with the longitudinal stretch, and means for driving the second of the two wheels so as to actuate the drive means and the upper wheel by means of the drive means.

3. Apparatus for stretching film comprising a plurality of opposed pairs of interspaced drawing devices adapted to act on opposite edge portions of the film fed thereto in a stretchable and taut state so as to stretch the film longitudinally, each said drawing device comprising first and second lower wheels, an endless drive means extending around said first and second lower wheels and an upper wheel pressing downwards on the drive means so as to form a nip for the film edge portions, and each pair of opposed drawing devices being mutually angled divergently in the direction of travel of the film so that the film is stretched laterally substantially simultaneously with the longitudinal stretching, the interspacing between successive opposed pairs of drawing devices and their drawing speeds being progressively greater in the direction of travel of the film through the apparatus.

4. Apparatus as claimed in claim 1, in which the drive means is a chain.

5. Apparatus as claimed in claim 1, in which the drive means is a belt.

6. Apparatus as claimed in claim 1 in which the upper wheel in each device is height adjustable so that its pressure on the drive means may be varied.

7. Apparatus as claimed in claim 1 in which the upper wheel in each device is separately driven through gearing.

8. Apparatus as claimed in claim 1 in which the upper wheel in each device is rubber faced.

9. Apparatus as claimed in claim 1 in which the opposed pair of drawing devices are width adjustable.

10. Apparatus as claimed in claim 1 including a film extruding device from which film may be fed directly to said apparatus.

11. Apparatus as claimed in claim 1 including means for heating the film as it is being stretched in said apparatus.

12. Apparatus as claimed in claim 3 in which a plurality of successive drawing devices at one side are driven through a gear box from a single shaft.

13. Apparatus as claimed in claim 12 in which each gear box is driven by a Selsyn motor through reduction gearing and a master Selsyn motor is connected to a final drive to draw rolls and coiling gear for the stretched film.

14. Apparatus as claimed in claim 3 including a shaft to which the second lower wheel is fixed in each device which shaft also carries the first lower wheel of the next device idling thereon.

References Cited in the file of this patent

UNITED STATES PATENTS

| | | |
|---|---|---|
| 1,376,736 | Thornberg | May 31, 1921 |
| 3,004,284 | Limbach | Oct. 17, 1961 |

FOREIGN PATENTS

| | | |
|---|---|---|
| 754,108 | France | Aug. 21, 1933 |